(12) United States Patent
Lienard et al.

(10) Patent No.: US 6,633,661 B2
(45) Date of Patent: *Oct. 14, 2003

(54) METHOD OF COMPENSATION FOR THE THICKNESS OF AN ORGAN

(75) Inventors: Jean Lienard, Clamart (FR); Serge Muller, Guyancourt (FR); François Nicholas, Palaiseau (FR); Fabienne Betting, Paris (FR)

(73) Assignee: GE Medical Systems, Buc (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/447,883

(22) Filed: Nov. 23, 1999

(65) Prior Publication Data

US 2003/0152257 A1 Aug. 14, 2003

(30) Foreign Application Priority Data

Nov. 24, 1998 (FR) .......................................... 98 14786

(51) Int. Cl.$^7$ ................................................. G06K 9/00
(52) U.S. Cl. ..................... 382/132; 378/98.12; 600/407
(58) Field of Search ................................. 382/132, 131, 382/128; 128/922; 378/62, 54, 98.12; 600/407; 705/13; 250/587

(56) References Cited

U.S. PATENT DOCUMENTS

| | | | | |
|---|---|---|---|---|
| 5,361,307 A | * | 11/1994 | Hartley et al. | 382/278 |
| 5,457,754 A | * | 10/1995 | Han et al. | 382/128 |
| 5,550,888 A | * | 8/1996 | Neitzel et al. | 280/204 |
| 5,687,251 A | | 11/1997 | Erler et al. | 382/133 |
| 5,696,805 A | * | 12/1997 | Gaborski et al. | 378/54 |
| 6,415,015 B2 | * | 7/2002 | Nicolas et al. | 378/62 |
| 2003/0012338 A1 | * | 1/2003 | Lienard et al. | 378/98.12 |

FOREIGN PATENT DOCUMENTS

| | | |
|---|---|---|
| DE | 3214725 A1 | 10/1983 |
| EP | 0383269 A2 | 8/1990 |
| WO | 9837738 | 8/1998 |

\* cited by examiner

*Primary Examiner*—Bhavesh M. Mehta
*Assistant Examiner*—Barry Choobin
(74) *Attorney, Agent, or Firm*—Jay L Chaskin; Cantor Colburn, LLP (57) ABSTRACT

A method of compensation for the thickness of an organ in an X-ray machine of the type comprising an X-ray source and a detector of the beam of X-rays after it has passed through the organ, the detector being capable of converting the X-ray beam into a digital electronic signal, in which, from a digitized image, an image of the radiologic thicknesses of an organ traversed by the X-ray beam is calculated, a thickness threshold is defined, from this there is derived an algebraic compensation image to bring the pixels of a level below or above the threshold back to the value of the threshold, and the thickness image and a proportion of the compensation image are summed up, to obtain a compensated thickness image.

40 Claims, 5 Drawing Sheets

— thickness
--- intensity

METHOD OF COMPENSATION FOR THE THICKNESS OF AN ORGAN

BACKGROUND OF THE INVENTION

The present invention relates to the field of radiologic imagery which makes it possible to visualize an organ or an organ part, in general of the human body.

Conventionally, X-ray radiography has been performed by means of sensitized films acted upon by X-rays after their passage through the organ to be studied. Radiologists have been trained in the interpretation of such images. Novel imagery technologies—solid state detector and digital acquisition system—must be adapted to current practice and must furnish an equivalent perception of pertinent information that radiologists have to examine. In particular, one of the requirements that digital systems must satisfy consists in an extension of the dynamics of gray level that simulates a conventional film as faithfully as possible. To that end, the digital image is displayed on a screen that the radiologist adjusts in interactive fashion to identify all the clinical signs in perceiving relations among the various components of the image. But the precise perception of density information by means of the image displayed on the screen is limited by the dynamics of the screen. Now one must automatically pass from the high contrast of the image of origin, for example in the region of 30 to 50, to the low contrast offered by a video screen.

Currently, physicians apply conformation techniques to patients with the aim of limiting the dynamics of acquired images, for example by compression of thick regions, and/or by addition of absorbent substances to compensate for zones of little thickness. In the case of X-ray mammography, the breast is compressed to the smallest and most constant thickness possible. In the field of cardiology, contour filters are used to avoid problems related to poorly absorbent zones of the chest, such as the lungs. These filters consist in plates of a shape complementary to that of the heart, made of materials of given coefficients of X-ray absorption.

However, these techniques prove to be inadequate for the acquisition and digital processing of images, and difficult to carry out.

BRIEF DESCRIPTION OF THE INVENTION

The present invention will be understood better upon study of the detailed description and illustrated by the accompanying drawings, wherein:

The method of compensation for the thickness of an object, such as an organ is provided by an X-ray machine of the type containing a source of X-rays and a means of detection of the beam of X-rays after it has passed through the organ, the means of detection being capable of converting the X-ray beam into a digital electronic signal. From a digitized image, there is calculated an image of the radiologic thicknesses of the organ traversed by the X-ray beam, the thickness zero corresponding to the zones of the image without organ, a thickness threshold is defined, from this there is derived an algebraic compensation image making it possible to bring the pixels of lower or higher level back to the threshold to the value of the threshold, and the thickness image and a proportion of the compensation image are summed up, to obtain a compensated thickness image.

The compensation image is filtered through a low-pass filter, then through the mask, prior to summation of the images.

Thus, the invention provides an image processing method furnishing an image equivalent to that which would be obtained by arranging an absorbent liquid on the edges of the organ over a part of their height and makes it possible to simulate a physical phenomenon which furnishes a better understanding of the optimal adjustment of the parameters that must be effected. This image processing gives the organ studied a natural and pleasant appearance. The method is easy to carry out by the adaptation of existing digital X-ray machines and may be applied to the radiography of any organ whatsoever.

BRIEF DESCRIPTION OF THE DRAWINGS

The present invention will be understood better upon study of the detailed description of one embodiment taken by way of example, not at all limitative, and illustrated by the accompanying drawings, wherein.

DETAILED DESCRIPTION OF THE INVENTION

The thickness of an organ as it is measured by X-rays is called radiologic thickness, in other words, taking account of the absorption of the materials traversed. For example, 1 cm of bone has the same radiologic thickness as 4 cm of water.

The thickness image may be obtained by means of Lambert's law: $I=Ioe-\mu t$ with I the number of photons received at a given point of the detection means, Io the number of photons not having passed through the organ and received at a given point of the detection means, $\mu$ the coefficient of linear absorption of the X-rays through the material traversed, and t the thickness of material traversed, from which there is derived: $\ln Io - \ln I = \mu t$, the product $\mu t$ corresponding to the gray level for one pixel of a radiologic thickness image.

In one embodiment of the invention, a threshold is established corresponding to a given thickness depending upon the nature of the organ. All thicknesses above this threshold and then a predetermined part of the lesser thicknesses remaining and closest to the threshold are suppressed. A mask defining the contour of the said organ is thus obtained. The value 1 is applied to the zones of the image corresponding to the organ and the value 0 is applied to the zones of the image not corresponding to the organ. Then the product of the mask by the digitized image is taken to obtain an image corresponding only to the organ.

In one embodiment of the invention, a supplementary thickness threshold is defined as a function of a predetermined proportion of pixels of a level below the threshold. From this there is derived a compensation image to bring the pixels of a level below the threshold back to the value of the threshold, the compensation image is filtered through a low-pass filter and then through the mask, and the image corresponding only to the organ and a proportion of the compensation image are summed up.

In one embodiment of the invention, the low-pass filter is calculated to eliminate the pixels corresponding to an organ filled with contrast medium in the compensation image and thus preserve them in the compensated image.

Erosion of the mask is effected prior to the product of the mask by the digitized image.

In one embodiment of the invention, the predetermined part of the remaining thicknesses below and closest to the threshold is comprised between 1 and 5%.

In one embodiment of the invention, the threshold is determined as a function of the size of the organ, for example 1 cm for an organ 5 cm thick.

In one embodiment of the invention, the supplementary thickness threshold is defined as a function of a predetermined proportion of pixels equal to 20% of the pixels above the supplementary threshold.

In another embodiment of the invention, the thickness of the organ is determined by comparison of the thickness histogram with a preestablished model curve, a parabola approaching the first of the maximums of the thickness histogram is calculated and the thickness threshold at the intersection of the parabola and the abscissa of the thicknesses is selected.

In one embodiment of the invention, two thickness thresholds, high and low, are defined, the compensation image being calculated to bring the pixels of a level below the threshold back to the value of the low threshold, and the pixels of a level above the high threshold back to the value of the high threshold. In the latter case, the compensation image has a negative value.

Figure 1:
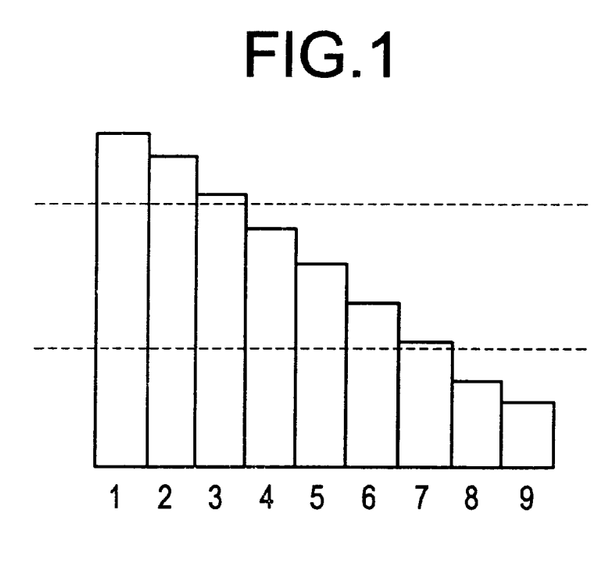
FIG. 1 is a schematic representation of an organ composed of zones of various thicknesses.
Figure 2:
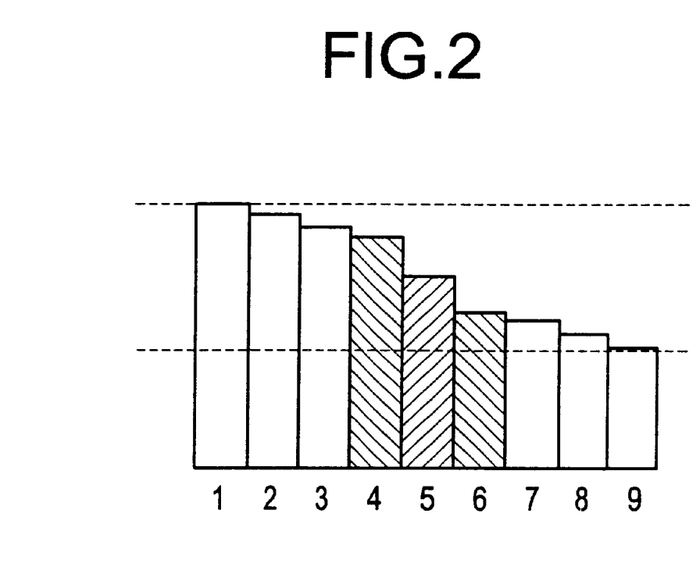
FIG. 2 is a schematic representation of an organ composed of zones of various compensated thicknesses.

As can be seen in FIG. 1, the dynamics of an image of an organ may be greater than the dynamics of thicknesses representable by the visualization screen and which are represented by the two horizontal dotted lines. Thus, the blocks 1 to 3 are situated at too high a gray level while the blocks 8 and 9 are situated at too low a level. The physical phenomena or the parts of the organ that are located in such zones therefore are not visualized in satisfactory fashion. While preserving the same screen dynamics, first of all the blocks 5 to 9 could be visualized and then, subsequently and after modification of the parameters of luminosity of the screen, the blocks 1 to 4. Taking the example of mammnography, a first image would be obtained on which only the contour of the breast would be seen, without its internal tissues being seen. The second image would show only its internal tissues, adipose zone or glandular zone, without its contour being apparent, which is hardly practical and complicates the radiologist's work, In the present invention, digital compensation of the raw image is based on the following principle: the method of image compensation simulates the addition or removal of an appropriate quantity of matter in border regions, for example between the zones of strong absorption and the zones of weak absorption of X-rays, so that the dynamics are reduced while taking account of the constraint of preservation of the differences and the real ratios among the anatomical structures. Thus, it can be seen that in FIG. 2, blocks 1 to 9 are contained within the limits of the dynamics of the screen. Blocks 1 to 3, instead of being saturated in white, are brought back to just below the upper limit of saturation and preserve their original relation, namely: block 1 lighter than block 2 lighter than block 3, etc. The same is true for blocks 8 and 9, which, instead of being black, are situated near the lower limit of the dynamics, so as to be visible and while preserving their original difference, block 7 lighter than block 8 lighter than block 9.

Figure 3:
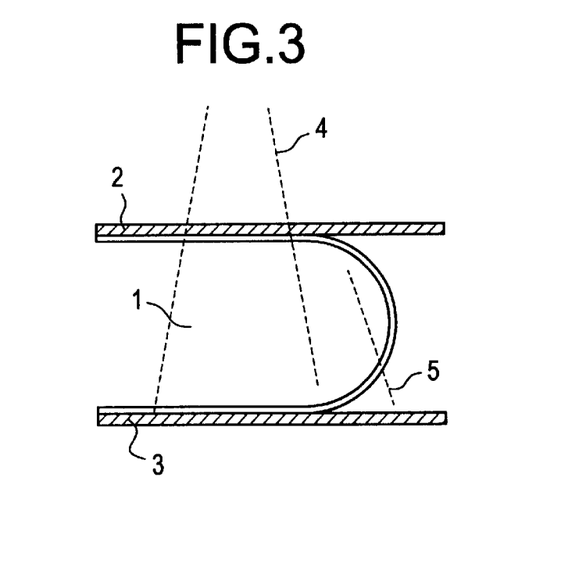
FIG. 3 is a schematic view of a breast in a compression plate.

FIG. 3 shows a breast 1 compressed between a plate 2 and table 3 which make up part of an X-ray machine, not represented. The breast is subjected to an X-ray beam 4 emitted by a source not represented. A digital detector, not represented, is arranged on the path of the X-ray beam 4 after its passage through the breast 1. It is noted that certain X-rays, labelled 5, pass through only a part of the thickness of the breast because of its rounded shape at the end. The result of this is that these X-rays are less attenuated than those that have passed through the totality of the thickness of the breast, which risks leading to saturation of the image portion corresponding to the rays 5 and to display of a portion of black screen. In fact, a white portion corresponds to a thick zone and a black portion corresponds to a zone that is not very thick, by convention.

Figure 4:
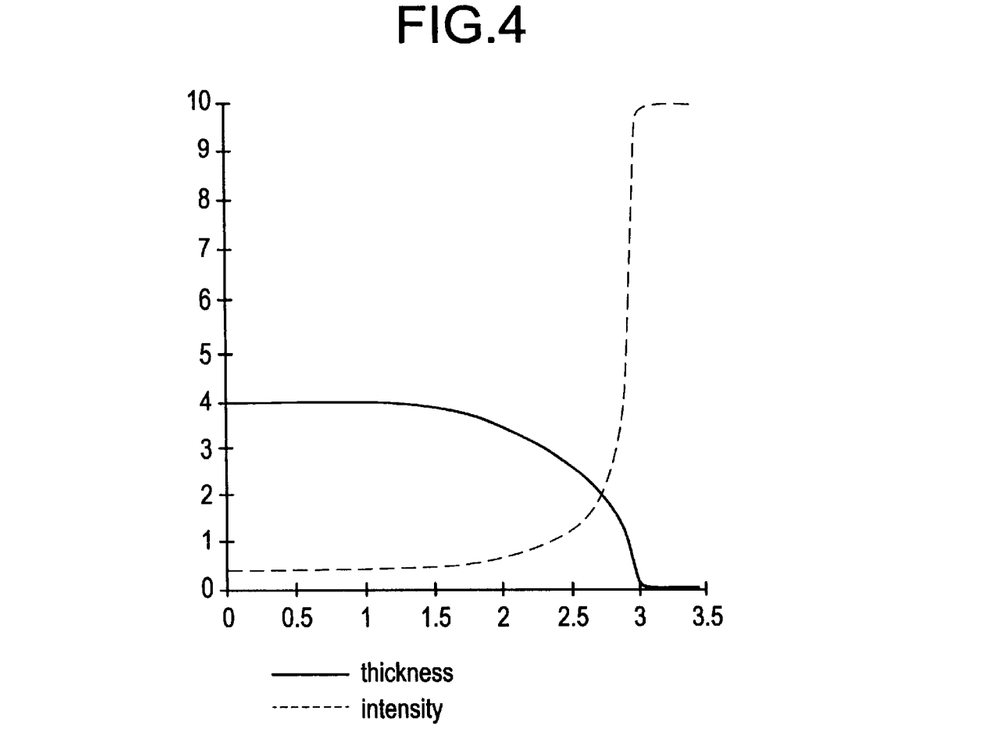
FIG. 4 is a diagram representing the evolution of the thickness of the breast and the corresponding intensity of X-rays and corresponding to FIG. 3.

The diagram of FIG. 4 illustrates this situation. When the thickness diminishes, the intensity (or number of photons) increases considerably, which makes the edge of the breast difficult to see. The result of this is that tumors and microcalcifications at the edge of the breast may be missed by the radiologist analyzing the anatomy of the central part of the breast. The method of compensation as disclosed herein brings it to bring the visibility of the edge of the breast to almost the same level as the visibility of the central part of the breast.

Figure 5:
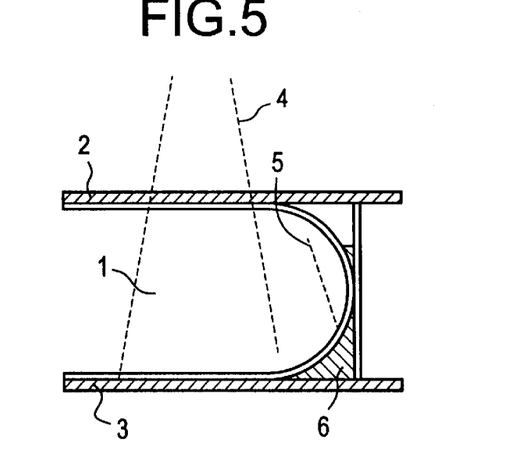
FIG. 5, similar to FIG. 3, shows the arrangement of an absorbent liquid in complementary shape with the breast.
Figure 6:
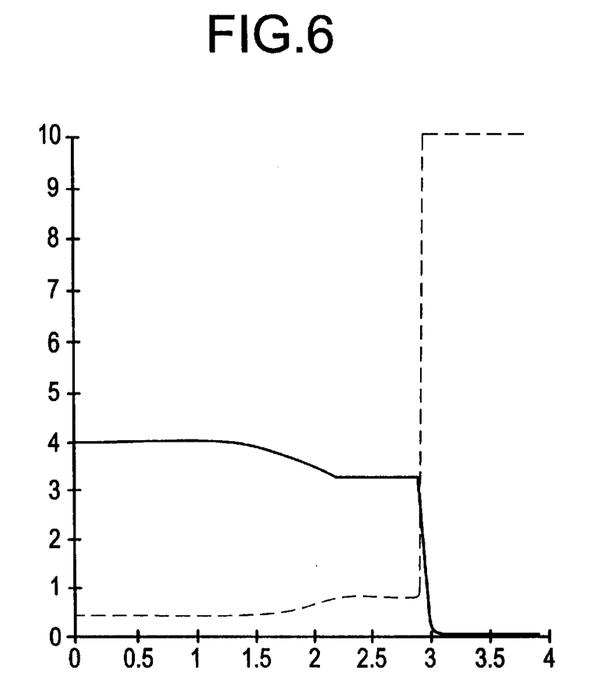
FIG. 6 is a diagram similar to that of FIG. 4 and corresponding to FIG. 5.

To that end, fill-in is simulated to a level H (FIG. 5) of a sector previously filled with air in contact with the end of the breast. Fill-in is effected with a solution 6 that increases the apparent thickness of the breast at its edge. This is equivalent to positioning contour filters or placing sacks of flour along the arms or neck of the patient for arteriography to avoid the saturation of image in these regions of little thickness. Providing a liquid 6 of course permits perfect adaptation to the shape of the region that must be compensated in thickness. An apparent thickness and an intensity whose evolution is represented in FIG. 6 and which presents a much more favorable configuration are thus obtained. However, providing a liquid imposes handling constraints that it would be desirable to avoid. The method as disclosed is able to simulate the presence of the liquid.

Figure 7:
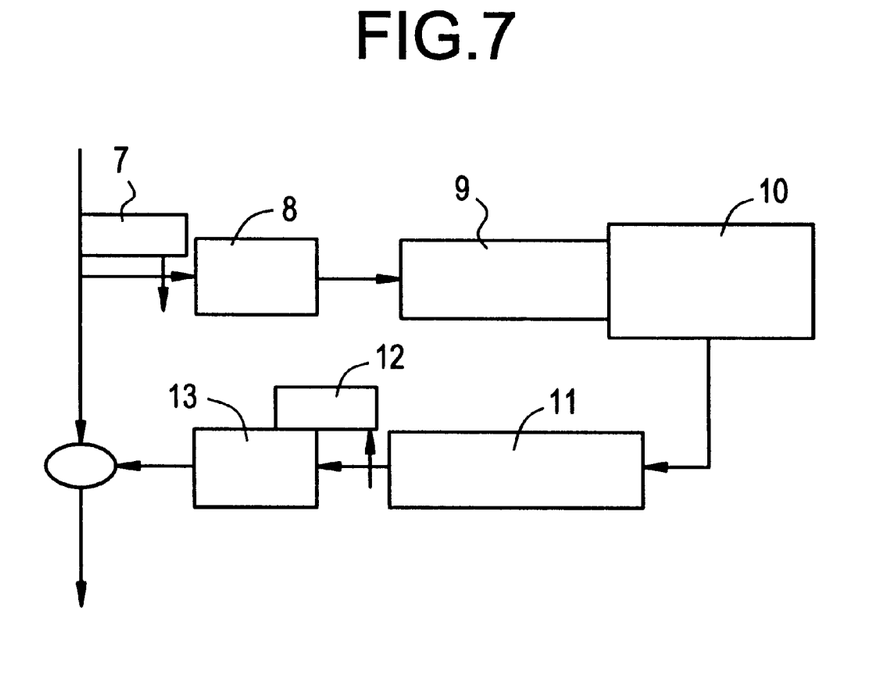
FIG. 7 is a diagram of the image processing.

The various steps of the method according to an embodiment of the invention are represented in FIG. 7. First, the input image coming from the detection means is subsampled, for example by a factor of Z=4, to reduce execution time, see block 7. In one variant, the method may be carried out with the original resolution of the image to avoid any artifact in the appearance of the skin of the organ.

In block 8, the logarithmic function that makes it possible to pass intensities is applied to the radiologic thicknesses. In block 9, extraction of the breast is effected. In block 10, estimate of the minimum thickness of the adipose zone of the breast is effected. In block 11, the compensation function is calculated. In block 12, the image is reestablished in its resolution of origin. In block 13, the exponential function is applied.

For a given point of the image, the number I of photons received by a given point of the detection means is determined by the following equation: $I = I_{max} \times e^{-\mu t}$, t being the thickness of the organ traversed by the X-rays and $\mu$ being the density of the organ traversed. Application of the logarithmic function results in: $\mu \times t = \ln(I_{max}) - \ln(I)$. Imax is known and corresponds to the number of photons that are received on a given point of the detection means and have not passed through the organ. Thus, the product $\mu \times t$, which is called densitometric or radiologic thickness, is found.

Figure 8:
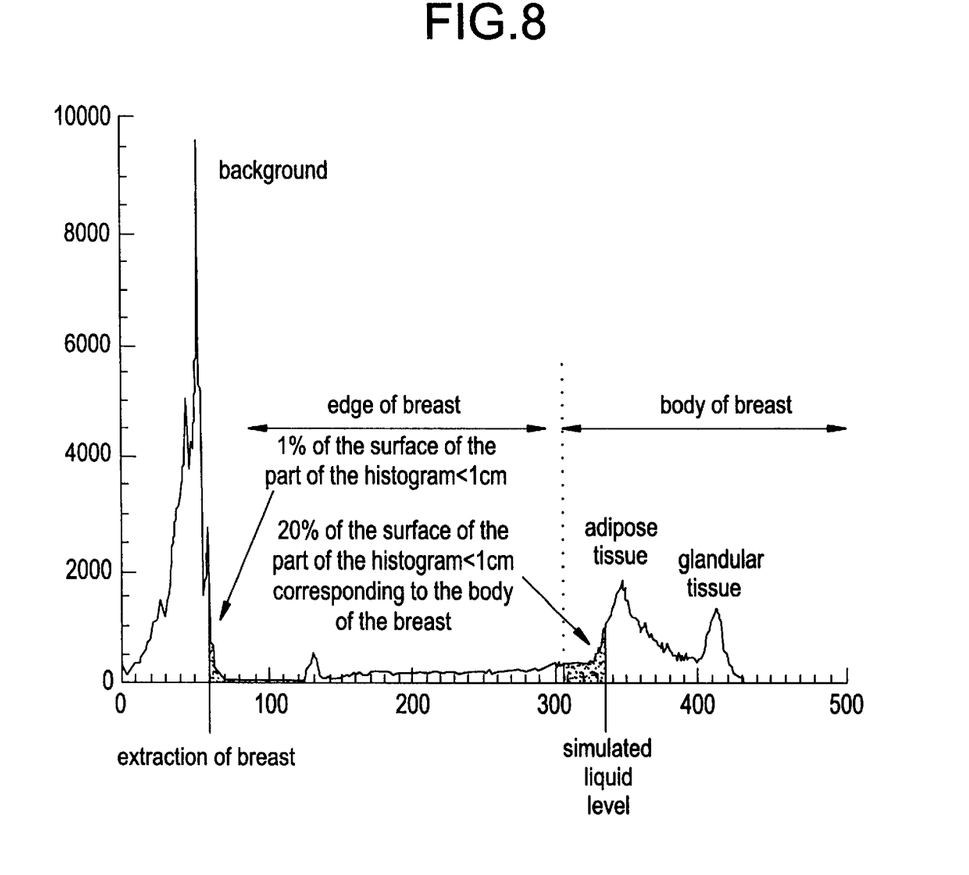
FIG. 8 is a histogram of thickness of the breast.

In practice, it may be preferable to apply a slightly different equation based on the magnitude G, which is the gray level of a given point of the detection means: $\mu t = K \times \ln(G_{max}+1) - K \times \ln(G+1)$ The gain K is applied to protect the variations in gray level greater than 1% of the maximum intensity, such as $K \times \ln(G_{max}+1) - K \times \ln(0.99\ G_{max}+1) \geq 1$. Application of this logarithmic function makes it possible to obtain a histogram of the thickness, as illustrated in FIG. 8.

Then the minimum thickness of the adipose zone is estimated. The histogram of thickness of the breast (FIG. 8) includes three principal regions, the base, the skin or edge of the breast and the body of the breast proper. First of all, a thickness threshold is defined, preferably adjustable as a function of the dimensions of the organ, for example equal to 1 cm for mammography. All thicknesses greater than this value are eliminated, then a given percentage, for example 1%, of thicknesses below the threshold value and closest to the said threshold value are eliminated. Then, a coefficient 1 is assigned to the zones corresponding to the breast, i.e., the zones previously excluded, and a coefficient 0 to the zones not corresponding to the breast, i.e., the zones previously preserved. A mask is thus obtained which, by multiplication with the image of the breast, makes it possible to preserve only the pixels corresponding to the breast and to suppress all the others.

Then, an erosion (operation of mathematical morphology) is carried out on a given thickness, for example about 1 cm thickness in the case of mammography, of this mask. The new mask thus obtained corresponds to the body of the breast. Then the product of this mask by the input image is taken, which makes it possible to preserve the image of only the region of the body of the breast, then 20% of the weakest pixels are eliminated, which corresponds, in FIG. 8, to suppressing 20% of the surface of the thickness histogram in the region of the body of the breast closest to the skin region. The limit of this 20% corresponds to the value of minimum thickness of the adipose zone $\mu a \times ta$ min.

Then the compensation to be provided is calculated. First of all, the image previously calculated is passed through a low-pass filter to preserve only slow variations of thickness $\mu \times t$. The compensation image $\mu aH$ is defined as being that which must be added to the filtered image $\mu \times t$ to obtain values equal to the minimum thickness of the adipose zone $\mu ata$ min: $\mu a \times H = \mu a \times ta\ min - \mu \times t > 0$. The liquid 6 whose presence is simulated to a height H has the same density tea as the adipose zone.

Multiplication of the compensation function by the mask is effected before and after low-pass filtering in order to avoid outside-the-breast compensation. The image $\mu \times t$ and a proportion of the compensation image $\mu aH$ are summed up in order to preserve the hierarchy of the compensated thicknesses. In other words, compensation is limited to a rate of less than 100%.

Of course, the parameters described above may be subjected to various adjustments in order to adapt them to various adipose zones of the breast or to other organs.

In a variant, use of the mask may be replaced by a simulation using an organ model. Then the thickness of the organ is determined by comparison of the thickness histogram with the preestablished model curve, a parabola approaching a part of the thickness histogram is calculated and the thickness threshold at the intersection of the parabola and the abscissa of thicknesses is selected.

In a variant, taking the product of the mask by the compensated image instead of applying it to the compensation image could be considered. This would have the drawback of suppressing certain variations of the base, as well as effecting compensation of parts of no interest.

In the field of vascular imagery, in particular for examinations of cardiac angiography, the same method may be applied by compensating poorly absorbent zones of the chest by virtual addition of matter and by virtual removal of matter in the dense zone of the diaphragm. In similar fashion, operations of arteriography of the carotid or of the lower extremities may be performed with the present invention. Then a high threshold and a low threshold are defined, the compensation image being calculated to bring the pixels of a level below the low threshold back to the value of the low threshold, and the pixels of a level above the high threshold back to the value of the high threshold.

For thick zones such as the chest, the following equations may be used:

$G = G_{max} \times e^{-\mu t}$ $\mu t = \ln(G_{max}) - \ln(G)$ $\mu aH$ = compensation in the Lung $\mu bL$ = compensation of the diaphragm or of the vertebrae Compensation is effected according to the following rule by adding the compensation $\mu aH$ and subtracting the compensation $\mu bL$:

$\mu t + \mu aH - \mu bL$, which results, after application of the exponential function, in $G \times e^{-\mu aH} \times e^{+\mu bL}$ Thus, in the dense zone of the diaphragm, compensation carried out will correspond to a virtual removal of matter so as to bring the dynamics of the image back to a value corresponding to that of the visualization screen. The same will be true in the zone of low density of the lung, where matter will be virtually added.

To preserve satisfactory visualization of arteries that are injected with contrast liquid but are relatively small in diameter, the filter will be adjusted so that it does not see the arteries, which will thus be absent from the compensation image and preserved in the compensated image. For example, if the filter eliminates details smaller than or equal to 1 cm, these will be preserved in the compensated image, while the details of dimensions greater than 1 cm will be erased.

The invention makes available a method of image processing capable of simulating a physical operation of provision or removal of an absorbent liquid, which permits ready comprehension of its functioning. The image obtained exhibits no artifacts and is natural in appearance. The method may be carried out in various fields of radiology, while eliminating the need for physical compensation devices.

Various modifications in structure and/or function and/or steps may be made by one skilled in the art to the disclosed embodiments without departing from the scope and extent of the invention.

What is claimed is:

1. A method of compensation for the thickness of an organ in an X-ray machine, of the type comprising a source of X-rays and a means for detection of the X-ray beam after it has passed through the organ, the means for converting the X-ray beam into a digital electronic signal in which, from a digitized image there is calculated an image of the radiologic thickness of the organ traversed by the X-ray beam, comprising the steps of:

defining the thickness threshold;

deriving an algebraic compensation image to bring the pixels of lower or higher level back to the threshold to the value of the threshold; and summing the thickness image and a proportion of the compensation image to obtain a compensated thickness image.

2. The method according to claim 1 comprising the steps of:

establishing a threshold corresponding to a given thickness depending upon the nature of the organ;

suppressing all thickness above this threshold and then a predetermined part of the less thicknesses remaining and closest to the threshold to obtain a mask defining the contour of the organ;

applying the value 1 to the zones of the image corresponding to the organ and the value 0 to the zones of the image not corresponding to the organ; and taking the product of the mask by the digitized image to obtain an image corresponding only to the organ.

3. The method according to claim 2 in which a supplementary thickness threshold is defined as a function of a predetermined proportion of pixels of a level above the threshold; from this there is derived a compensation image to bring the pixels of a level above the threshold down to the value of the threshold; the compensation image is filtered through a lower-pass filter and then through the mask; and the image corresponding only to the organ and a proportion of the compensation image are summed up.

4. The method according to claim 3 in which the low-pass filter is calculated to suppress the pixels corresponding to an organ filled with a contrast medium.

5. The method according to claim 2 in which an erosion of the mask is performed prior to the product of the mask by the digitized image.

6. The method according to claim 3 in which an erosion of the mask is performed prior to the product of the mask by the digitized image.

7. The method according to claim 4 in which an erosion of the mask is performed prior to the product of the mask by the digitized image.

8. The method according to claim 2 in which the predetermined part of the remaining thicknesses below and closest to the threshold is equal to 99%.

9. The method according to claim 3 in which the predetermined part of the remaining thicknesses below and closest to the threshold is equal to 99%.

10. The method according to claim 4 in which the predetermined part of the remaining thicknesses below and closest to the threshold is equal to 99%.

11. The method according to claim 5 in which the predetermined part of the remaining thicknesses below and closest to the threshold is equal to 99%.

12. The method according to claim 2 in which the threshold is determined as a function of the size of the organ.

13. The method according to claim 3 in which the threshold is determined as a function of the size of the organ.

14. The method according to claim 4 in which the threshold is determined as a function of the size of the organ.

15. The method according to claim 5 in which the threshold is determined as a function of the size of the organ.

16. The method according to claim 6 in which the threshold is determined as a function of the size of the organ.

17. The method according to claim 1 in which the thickness threshold is defined as a function of a predetermined proportion of pixels equal to 20%.

18. The method according to claim 1 in which the thickness of the organ is determined by comparison of the thickness histogram with a preestablished model curve; a parabola approaching the first maximum of the thickness histogram is calculated and the thickness threshold a the intersection of the parabola and the abscissa of the thickness is selected.

19. The method according to claim 1 in which two thickness thresholds, high and low, are defined, the compensation image being calculated to bring the pixels of a level below the low threshold back to the value of the low threshold, and the pixels of a level above the high threshold back to the value of the high threshold.

20. The method according to claim 1 in which the compensation image is filtered through a low-pass filter, then through the mask, prior to summation of the image corresponding to only the organ and the compensation image.

21. A method of compensation for the thickness of an object in a radiological apparatus having:

a source of radiation;

means for detection of the radiation after it has passed through the object;

the means for converting the radiation into a signal to provide an image of the object traversed by the radiation comprising:

defining a thickness threshold;

deriving an algebraic compensation image to bring pixels of lower or higher level back to the value of the threshold while preserving time differences and ratios between within anatomical structures; and summing the thickness image and a proportion of the compensation image to obtain a compensated thickness image.

22. The method according to claim 21 comprising:

establishing a threshold corresponding to a given thickness depending upon the nature of the object;

suppressing all thickness above the threshold;

obtaining a mask defining the contour of the object from a predetermined part of the lesser thicknesses remaining and closest to the threshold;

applying a first value to the zones of the image corresponding to the object;

applying a second value to the zones of the image not corresponding to the object; and taking the product of the mask by the image to obtain an image corresponding only to the object.

23. The method according to claim 22 comprising:

defining a supplementary thickness threshold as a function of a predetermined proportion of pixels of a level above the threshold;

deriving a compensation image to bring the pixels of a level above the threshold down to the value of the threshold;

filtering the compensation image through a filter;

filtering the compensation image the mask; and summing the image corresponding only to the organ and a proportion of the compensation image.

24. The method according to claim 23 in which the filter is a low-pass filter calculated to suppress the pixels corresponding to an organ filled with a contrast medium.

25. The method according to 22 comprising:
performing an erosion of the mask prior to the product of the mask by the image.

26. The method according to 23 comprising:
performing an erosion of the mask prior to the product of the mask by the image.

27. The method according to 24 comprising:
performing an erosion of the mask prior to the product of the mask by the image.

28. The method according to claim 22 in which the predetermined part of the remaining thicknesses below and closest to the threshold is equal to 99%.

29. The method according to claim 23 in which the predetermined part of the remaining thicknesses below and closest to the threshold is equal to 99%.

30. The method according to claim 24 in which the predetermined part of the remaining thicknesses below and closest to the threshold is equal to 99%.

31. The method according to claim 25 in which the predetermined part of the remaining thicknesses below and closest to the threshold is equal to 99%.

32. The method according to claim 22 in which the threshold is determined as a function of the size of the object.

33. The method according to claim 23 in which the threshold is determined as a function of the size of the object.

34. The method according to claim 24 in which the threshold is determined as a function of the size of the object.

35. The method according to claim 25 in which the threshold is determined as a function of the size of the object.

36. The method according to claim 26 in which the threshold is determined as a function of the size of the object.

37. The method according to claim 21 in which the thickness threshold is defined as a function of a predetermined proportion of pixels equal to 20%.

38. The method according to claim 21 comprising:
determining the thickness of the object by comparison of a thickness histogram with a preestablished model curve;

calculating a parabola approaching the first maximum of the thickness histogram; and selecting the thickness threshold at the intersection of the parabola and the abscissa of the thicknesses.

39. The method according to claim 21 comprising:
defining two thickness thresholds, high and low;

calculating the compensation image to bring the pixels of a level below the low threshold back to the value of the low threshold; and calculating the compensation image to bring the pixels of a level above the high threshold back to the value of the high threshold.

40. The method according to claim 21 comprising:
filtering the compensation image through a low-pass filter;

filtering the compensation image through the mask, prior to summation of the image corresponding only to the object and the compensation image.

* * * * *